United States Patent
Mincher et al.

(10) Patent No.: US 8,913,189 B1
(45) Date of Patent: Dec. 16, 2014

(54) AUDIO AND VIDEO PROCESSING ASSOCIATED WITH VISUAL EVENTS

(71) Applicant: Amazon Technologies, Inc., Reno, NV (US)

(72) Inventors: Richard William Mincher, Cupertino, CA (US); Todd Christopher Mason, Danville, CA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/790,272

(22) Filed: Mar. 8, 2013

(51) Int. Cl.
H04N 9/475 (2006.01)
H04N 5/04 (2006.01)

(52) U.S. Cl.
CPC .............. *H04N 5/04* (2013.01); *Y10S 715/972* (2013.01)
USPC ........... 348/515; 348/500; 348/510; 348/512; 348/513; 348/516; 348/518; 348/521; 348/522; 348/569; 348/423.1; 348/425.4; 348/429.1; 348/432.1; 348/460; 348/462; 348/463; 348/464; 348/473; 348/495; 348/706; 348/719; 348/725; 348/739; 348/207.1; 348/231.4; 715/201; 715/202; 715/203; 715/273; 715/716; 715/727; 715/728; 715/729; 715/756; 715/972; 725/18; 725/38; 725/41; 725/86; 725/93; 725/113; 725/146

(58) Field of Classification Search
USPC ................. 348/515, 473, 460, 464, 512, 518, 348/207.1, 500, 510, 513, 516, 521, 522, 348/569, 423.1, 425.4, 429.1, 462, 463, 348/495, 706, 719, 725, 739, 231.4; 725/136, 112, 113, 19, 18, 38, 41, 86, 725/93, 146; 715/203, 201, 202, 273, 716, 715/727, 728, 729, 756, 972
See application file for complete search history.

(56) References Cited

U.S. PATENT DOCUMENTS

| | | | |
|---|---|---|---|
| 4,099,116 A * | 7/1978 | Tyndall | 324/329 |
| 8,363,161 B2 * | 1/2013 | Pearlstein | 348/515 |
| 8,381,086 B2 * | 2/2013 | Li et al. | 715/203 |
| 8,531,603 B2 * | 9/2013 | Strein et al. | 348/512 |
| 2006/0133251 A1 * | 6/2006 | Thangaraj et al. | 369/59.17 |
| 2006/0140280 A1 * | 6/2006 | Okada et al. | 375/240.28 |
| 2006/0140575 A1 * | 6/2006 | Fuchigami et al. | 386/1 |
| 2007/0276670 A1 * | 11/2007 | Pearlstein | 704/270 |
| 2009/0077460 A1 * | 3/2009 | Li et al. | 715/203 |
| 2009/0268038 A1 * | 10/2009 | Matsumoto | 348/207.1 |
| 2010/0023842 A1 * | 1/2010 | Rahrer et al. | 714/776 |
| 2010/0319015 A1 * | 12/2010 | Remington | 725/19 |
| 2013/0141643 A1 * | 6/2013 | Carson et al. | 348/515 |

\* cited by examiner

*Primary Examiner* — Jefferey Harold
*Assistant Examiner* — Mustafizur Rahman
(74) *Attorney, Agent, or Firm* — Lindauer Law, PLLC

(57) ABSTRACT

Audio data and video data are processed to determine one or more audible events and visual events, respectively. Contemporaneous presentation of the video data with audio data may be synchronized based at least in part on the audible events and the visual events. Audio processing functions, such as filtering, may be initiated for audio data based at least in part on the visual events.

20 Claims, 10 Drawing Sheets

AUDIO AND VIDEO PROCESSING ASSOCIATED WITH VISUAL EVENTS

BACKGROUND

Audio data, video data, or both, is presented in a wide variety of situations. In situations where audio data and video data are presented contemporaneously, such as with a movie, presentation of the audio data and the video data may become unsynchronized. For example, the video may depict a person speaking but corresponding audio may have already been presented, or vice versa. This unsynchronized presentation may result in an adverse user experience. Likewise, the audio data may contain noise other than human speech, which adversely impacts the audio as presented, such as background noises.

Figure 1:
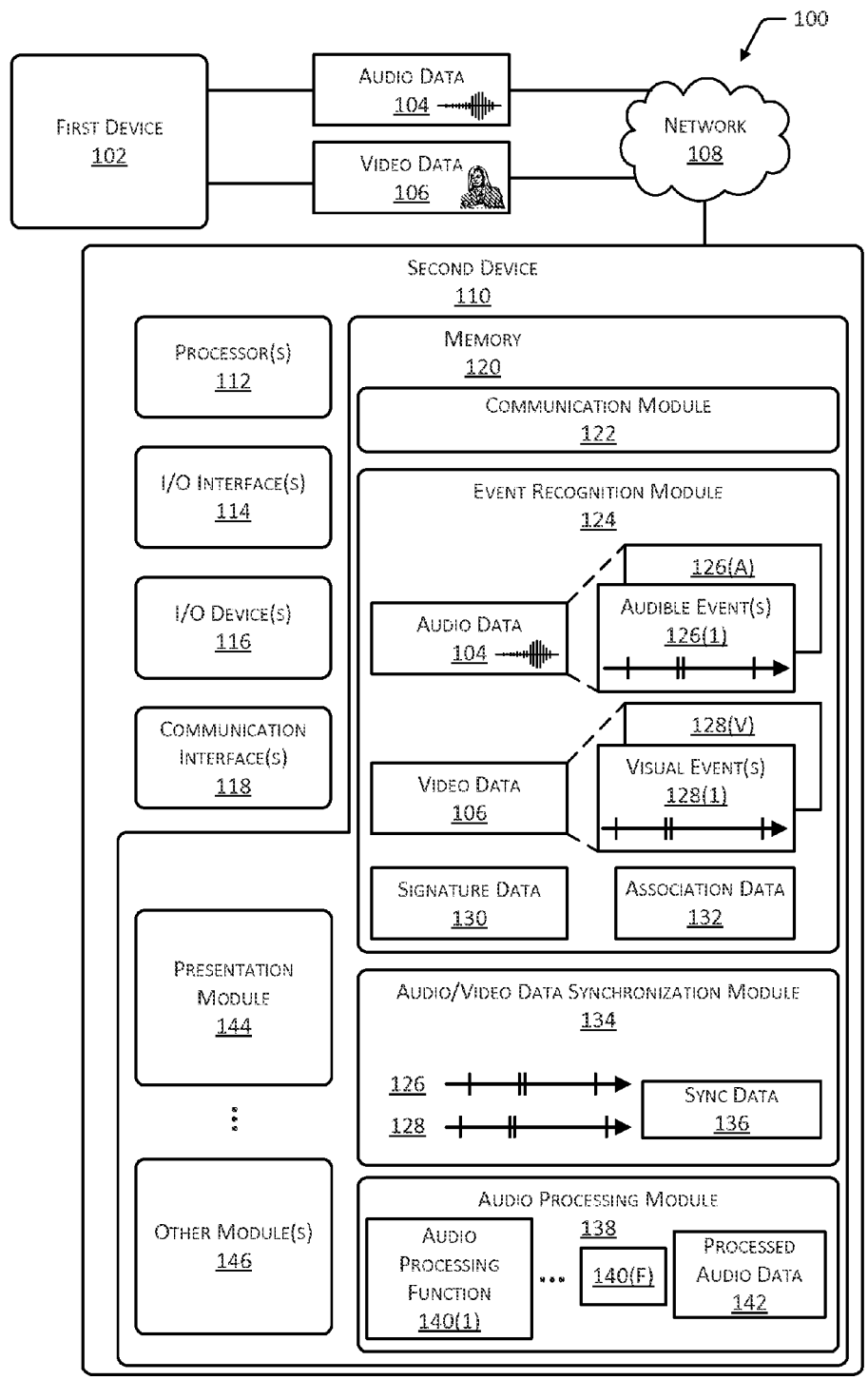
FIG. 1 is an illustrative system for audio and video processing associated with audio events, visual events, or both.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

Audio data contains information which, when presented, produces sounds which are audible to a user. Similarly, video data contains information which, when presented, produces a series of images which are visible to the user as a moving image. Audio data and video data may be presented together, such as in movies, television, and so forth.

Preferably the audio data and the video data are synchronized such that audible events, such as the sound of a person speaking or a door closing, occur contemporaneously with an associated visual event, such as the image of the person's mouth moving or the door closing.

The audio data and the video data may have been captured unsynchronized or may become unsynchronized during processing, transmission, presentation, and so forth. For example, a television may introduce delays in processing and decoding a signal which results in audio data that is unsynchronized with video data. Loss of data such as frame drops during transmission, processing errors, changes in encoding rates, and so forth, may further result in synchronization problems. As a result, a magnitude of the misalignment or asynchronization may vary over time. For example, at one portion in a movie, the audible events and the visual events may be misaligned by +110 milliseconds (ms) while in another portion of the same movie the audible events and the visual events may be misaligned by −227 ms. As used in this disclosure, a positive misalignment such as +100 ms indicates the audible event leads the corresponding visual event while a negative misalignment such as −227 ms indicates the audible event lags the visual event.

Described in this disclosure are systems and techniques for using information about the audio events and the visual events to synchronize the audio data and the video data. By determining audio events and their corresponding visual events, synchronization data is generated which indicates an extent and direction of misaligned or unsynchronized audio data and video data. The synchronization data (or "sync data") may then be used to adjust presentation, such as delaying or advancing presentation of at least a portion of the audio data or the video data until the two are synchronized.

Also described in this disclosure is the use of the visual event data to apply one or more audio processing functions to the corresponding audible events in the audio data. For example, while a person is speaking as determined by the visual events of their mouth moving, an audio processing function configured to enhance speech may be used on the audible events of the utterances of the person. This technique may be used in situations where the audio data is stored or sent to another device, while the video data is not. For example, a camera at a first computing device may be used to capture the video data and the audio data. The visual elements are used to determine when to apply the audio processing functions, and the resulting processed audio data, but not the video data, may then be sent to a second device for presentation of the audio.

These techniques may be applied at a source device, storage device, intermediate processing device, or a presentation device. For example, a source device such as a video camera with microphone may use these techniques to synchronize the audio data and the video data, enhance the audio, or both. In another example, a storage device such as a streaming content server may use these techniques to deliver synchronized content. The intermediate processing device, such as equipment used in post-production, may apply these techniques to improve audio quality, adjust synchronization, and so forth. Likewise, the presentation device may receive audio data and video data which has become unsynchronized during transmission and may use these techniques to remedy this situation.

These techniques may be applied to audio data and video data recorded for storage, real-time or near-real-time transfer or streaming, and so forth. For example, these techniques may be used to provide synchronization of the audio data and video data associated with a real-time video conference. Using these techniques, the overall user experience during presentation of the audio data and the video data may be improved.

Illustrative System

FIG. 1 is an illustrative system 100 for audio and video processing associated with audio events, visual events, or both. A first device 102 is depicted. The first device 102 may include a video camera with microphone, a smartphone, a tablet computer, a desktop computer, a laptop computer, an in-vehicle communication system, a server, and so forth. The first device 102 outputs audio data 104 and corresponding video data 106. The audio data 104 comprises information indicative of one or more sounds, while the video data 106 comprises information indicative of a plurality of images. The audio data 104 and the video data 106 correspond to one another. For example, the audio data 104 may comprise the composite track which includes a dialogue track, sound effects track, music track, and so forth, which goes along with the plurality of images.

The audio data 104 and the video data 106 may be transferred from the first device 102 using a network 108 to a second device 110. The network 108 may include a High Definition Multimedia Interface ("HDMI") as promulgated by HDMI Licensing LLC, TOSLINK as promulgated by Toshiba Corp., WiDi as promulgated by Intel Corp., Miracast™ as promulgated by the Wi-Fi Alliance, analog video, analog audio, IEEE 1394 as promulgated by the Institute for Electrical and Electronics Engineers ("IEEE"), Universal Serial Bus ("USB") as promulgated by the USB Implementers Forum, Bluetooth® as promulgated by the Bluetooth Special Interest Group, Ethernet, Wi-Fi™ as promulgated by the Wi-Fi Alliance, and so forth. The network 108 may include a local network, a wide area network, broadcast network, or a combination thereof.

The second device 110 is configured to provide for processing of the audio data 104, the video data 106, or both. The second device 110 may include one or more processors 112 configured to execute one or more stored instructions. The processors 112 may comprise one or more cores. The second device 110 may include one or more input/output ("I/O") interface(s) 114 to allow the processor 112 or other portions of the second device 110 to communicate with other devices. The I/O interfaces 114 may comprise inter-integrated circuit ("I2C"), serial peripheral interface bus ("SPI"), USB, RS-232, HDMI, TOSLINK, analog video, analog audio, IEEE 1394, Bluetooth®, and so forth.

The I/O interface(s) 114 may couple to one or more I/O devices 116. The I/O devices 116 may include input devices such as one or more of a camera, a microphone, a touch sensor, a button, and so forth. The I/O devices 116 may also include output devices such as one or more of a display, audio speakers, haptic output device, and so forth. In some embodiments, the I/O devices 116 may be physically incorporated with the second device 110 or may be externally placed.

The second device 110 may also include one or more communication interfaces 118. The communication interfaces 118 are configured to provide communications between the second device 110 and other devices, such as the first device 102, routers, access points, servers, and so forth. The communication interfaces 118 may connect to the network(s) 108, such as personal area networks ("PANS"), wired and wireless local area networks ("LANs"), wide area networks ("WANs"), and so forth. For example, Ethernet, Wi-Fi™, 3G, 4G, and so forth.

The second device 110 may also include one or more busses or other internal communications hardware or software that allow for the transfer of data between the various modules and components of the second device 110.

As shown in FIG. 1, the second device 110 includes one or more memories 120. The memory 120 comprises one or more computer-readable storage media ("CRSM"). The CRSM may be any one or more of an electronic storage medium, a magnetic storage medium, an optical storage medium, a quantum storage medium, a mechanical computer storage medium, and so forth. The memory 120 provides storage of computer readable instructions, data structures, program modules, and other data for the operation of the second device 110.

The memory 120 may include at least one operating system (OS) module (not shown). The OS module is configured to manage hardware resource devices such as the I/O interfaces 114, the I/O devices 116, the communication interfaces 118, and provide various services to applications or modules executing on the processors 112. Also stored in the memory 120 may be one or more of the following modules which may be executed as foreground applications, background tasks, daemons, and so forth.

A communication module 122 is configured to use the I/O interfaces 114, the communication interfaces 118, or a combination thereof to send or receive data with other devices. For example, the communication module 122 may be configured to receive the audio data 104 and the video data 106 from the first device 102.

An event recognition module 124 is configured to determine one or more audible events 126(1), 126(2), . . . , 126(A) in the audio data 104 and one or more visual events 128(1), 128(2), . . . , 128(V) in the video data 106. The audible event 126 comprises a portion of the audio data 104 in which a particular sound is present. The audible event 126 may be indicated by a particular sound signature, such as a spectral analysis, waveform, descriptive function, and so forth. The visual events 128 comprise a portion of the video data 106 in which a particular object, motion, activity, and so forth, is depicted in one or more images. The visual event 128 may be indicated by a particular hash, descriptive metadata, image correlation factor, descriptive function, and so forth.

In some implementations, information indicative of the audible events 126, the visual events 128, or both may be provided as a separate file, embedded within the audio data 104 or the video data 106, and so forth. For example, in one implementation, information indicative of the audible events 126 may be embedded as metadata into the audio data 104, and likewise the visual events 128 into the video data 106. The audible events 126 and the visual events 128 are discussed in more detail below with regard to FIG. 3.

The signature data 130 contains previously stored information about audible events 126 and visual events 128. This information may contain spectral data, waveforms, images, hashes, and other information which may be used to identify or designate a particular event in the audio data 104, the video data 106, or both. For example, the signature data 130 may include previously determined audible events 126, visual events 128, and the correspondence between the two events. In some implementations, the signature data 130 may be manually generated, such as a human user associating a portion of audio data 104 in which a person is speaking with corresponding video data 106 showing the person's face while speaking. In other implementations, one or more machine learning techniques may be used to generate the signature data 130. For example, audio data 104 and video data 106 which have been determined to be synchronized with one another may be used to train a neural network to associate the audible events 126 and the visual events 128.

Association data 132 establishes a correspondence, or a linkage, between one or more audible events 126 and one or more visual events 128. For example, the audible events 126 which include an utterance by a person may be associated with the visual events 128 of a person's mouth moving. Similarly, the audible event 126 of an explosion may be associated with the visual event 128 of a fireball. The association data 132 is discussed in more detail below with regard to FIG. 3.

An audio/video ("AV") data synchronization module 134 is configured to generate sync data 136. The sync data 136 is based at least in part on a correspondence between one or more of the audible events 126 and one or more of the associated visual events 128.

The sync data 136 indicates an extent and direction of misaligned or unsynchronized audio data 104 and video data 106. For example, the sync data 136 may indicate that for a particular portion of the audio data 104 and the video data 106, the audio data 104 leads the video data 106 by +157 ms, such that the sound of the audible event 126 occurs 157 ms before the corresponding visual event 128.

In some implementations, the sync data 136 may be limited to audible events 126 and corresponding visual events 128 which occur within a pre-determined distance of one another. The distance may be expressed as time, frames, bytes, and so forth. For example, the audible event 126 of a person speaking a phoneme may be associated with the visual event 128 of a human face forming the phoneme which occurs within ten seconds of one another. This distance may be fixed or dynamically variable. For example, the distance may be proportionate to the number of events, such that the distance increases when the number of events decreases.

The memory 120 may also store an audio processing module 138. The audio processing module 138 is configured to use one or more audio processing functions 140(1), 140(2), . . . , 140(F) to modify at least a portion of the audio data 104 and generate processed audio data 142. The audio processing functions 140 may include filters, equalizers, attenuators, noise reduction algorithms, and so forth. In some implementations, at least a portion of the audio processing module 138 may be implemented as discrete electronic circuitry, a digital signal processor ("DSP") configured to implement the audio processing function 140, and so forth.

The audio processing module 138 is configured to process at least a portion of the audio data 104 based at least in part on one or more visual events 128 corresponding to that audio data 104. For example, the audio processing module 138 may apply an audio processing function 140 configured to improve intelligibility of human speech and reduce ambient noise for portions of the audio data 104 in which the visual events 128 indicate a human utterance. During portions of the audio data 104 which are not associated with the visual events 128, this audio processing function 140 may be discontinued, or another audio processing function 140 may be used.

A presentation module 144 is configured to present the audio data 104 and the video data 106. The presentation module 144 may be configured to present the audio data 104 using one or more speakers or other audio output devices, the video data 106 using one or more displays or other video output devices, or both. The presentation module 144 may be configured to use the sync data 136 to modify the presentation of the audio data 104 and the video data 106 such that the presentation of audible events 126 and corresponding visual events 128 are presented contemporaneously. Contemporaneous presentation may include presentation in which the corresponding events are output such that they are presented exactly simultaneously, or may be within a predetermined window of time, such as within ±50 ms of one another.

The presentation module 144 may be configured to modify presentation by introducing delays, adding or dropping data, and so forth. For example, where the audible events 126 lead the visual events 128, a delay may be introduced into the presentation of the audio data 104 such that the events are synchronized upon presentation.

Other modules 146 may also be stored in the memory 120. For example, a user interface module may be configured to provide a user interface to a user using the I/O devices 116. The user interface may include one or more visual, audible, or haptic elements. For example, the user interface may be configured to provide a graphical user interface ("GUI"), an audible user interface, and so forth.

In some implementations one or more of the modules described in the second device 110 may be stored at least in part, executed at least in part, or both, on other devices. For example, a third device may comprise the AV data synchronization module 134 and the presentation module 144.

The first device 102 may be similar to the second device 110 in construction, components, modules, and so forth. For example, the first device 102 may comprise a video camera and a microphone coupled to one or more processors 112 configured to acquire the audio data 104 and the video data 106. In another example, the first device 102 may comprise a server configured to stream content comprising the audio data 104 and the video data 106.

Figure 2:
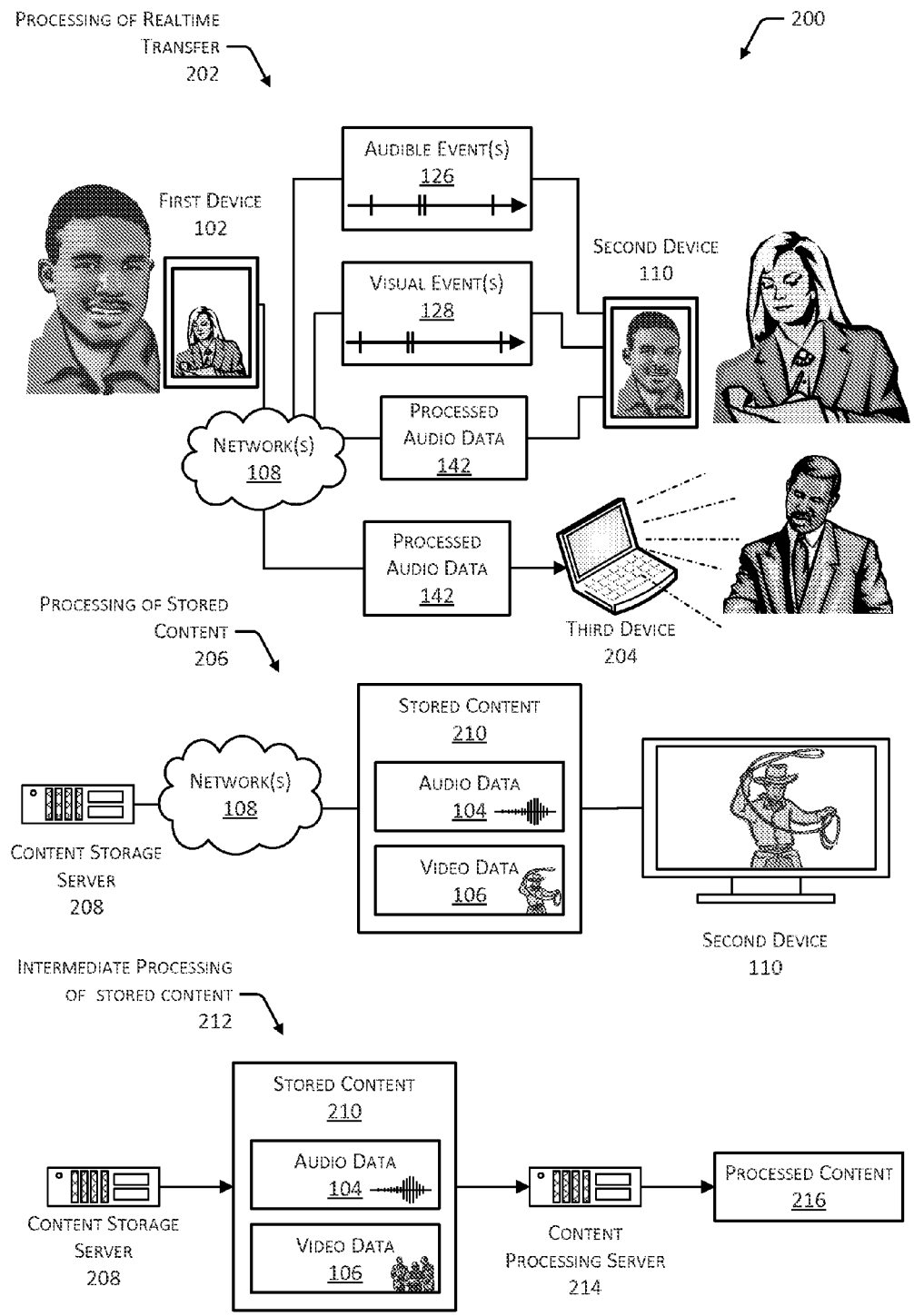
FIG. 2 illustrates different situations in which the audio and video processing may be used.

FIG. 2 illustrates different situations 200 in which the audio and video processing described in this disclosure may be used. An example is depicted of processing a real-time transfer 202. In this example, the first device 102 has established a bidirectional video and audio session, such as a videoconference or a video chat with the second device 110. The first device 102 is sending audio data 104(1) and video data 106(1) to the second device 110, and the second device 110 is sending audio data 104(2) and video data 106(2) to the first device 102. The data may be sent using one or more of the networks 108. As described above, due to processing delays on the devices, loss or delay of data during transit on the network 108, and so forth, the audio data 104 and the video data 106 may become unsynchronized.

In one implementation of the processing of a real-time transfer 202, the source of audio data 104 and video data 106 may use the event recognition module 124 to provide data about one or more audible events 126, one or more of the visual events 128, or both to a receiving device. As described above, this information about the events may be provided as a separate file, separate stream of data, or by embedded within the audio data 104, the video data 106, or both.

The AV data synchronization module 134 of the receiving device may then use the information about the audible events 126 and the visual events 128 to generate the sync data 136. The sync data 136 may then be used by the presentation module 144 to synchronize the audio data 104 and the video data 106. As a result, timing errors resulting from lost data, delays on the network 108, and so forth, are mitigated, and synchronized presentation is maintained, improving the user experience.

In other implementations of the processing of the real-time transfer 202, the sending device may provide only the audio data 104 and the video data 106. In this implementation, the event recognition module 124 of the receiving device or an intermediary device may be configured to generate the audible events 126, the visual events 128, or both.

As described above, the audio processing module 138 may be configured to modify at least a portion of the audio data 104 based at least in part on one or more visual events 128 corresponding to the audio data 104. The audio processing module 138 may operate on a sending device or on a receiving device.

In the processing of real-time transfer 202 example depicted here, the second device 110 is receiving the processed audio data 142 from the first device 102. In this example, the first device 102 detects when the user is speaking and applies an audio processing function 140 to improve intelligibility and mitigate background noise, generating the processed audio data 142. The processed audio data 142 is then sent to receiving devices such as the second device 110 and a third device 204. In this example, the third device 204 is participating in the conference as a listener only, and thus hears the processed audio data 142 from the first device 102, the second device 110, and so forth.

In another implementation of processing the real-time transfer 202, the first device 102 may send the audio data 104, such as based on input from a microphone in the first device 102, to the second device 110. The audio data 104 may be sent along with information indicative of visual events 128 corresponding to the audio data 104 or may be sent along with the video data 106. In this implementation, the audio processing module 138 may generate the processed audio data 142 on the second device 110. This generation may be based on the one or more visual events 128 received from the first device 102 or an intermediary device, or the processed audio data 142 may be generated by the event recognition module 124 of the second device 110 using the video data 106.

The third device 204 is also depicted as participating in the conference, but the user is only listening. In this illustration, the first device 102 (or an intermediary device) is sending the processed audio data 142 to the third device 204. In this implementation, the third device 204 may not receive the video data 106.

Another example depicts processing of stored content 206. In this implementation, a content storage server 208 uses the one or more networks 108 to send stored content 210 to the second device 110. The stored content 210 comprises the audio data 104 and corresponding video data 106. For example, the stored content 210 may comprise a television show while the second device 110 in this example is a television. As described above in FIG. 1, the second device 110 may receive the audio data 104 and the video data 106 and process both to synchronize the presentation of the audio data 104 and the video data 106, process the audio data 104, or both.

In another example, the audio data 104 and the video data 106 may be provided by a microphone and a camera, respectively, far enough from a source that propagation differences result in loss of synchronization. For example, the audio data 104 of a speaker at a podium several hundred feet away may be acquired with a directional microphone, while the video data 106 may be acquired using a camera with a long distance telephoto lens. Because the light forming the image of the speaker and podium travels at the speed of light to the camera, which is much faster than the corresponding sound waves, the resulting audio data 104 and video data 106 are no longer synchronized. As described above in FIG. 1, the second device 110 may receive the audio data 104 and the video data 106 and process both to synchronize the presentation of the audio data 104 and the video data 106, process the audio data 104, or both.

An example of intermediate processing of stored content 212 is also depicted. In this example, the content storage server 208 provides the stored content 210 to a content processing server 214. The content processing server 214 may be configured with one or more of the event recognition module 124, the AV data synchronization module 134, the audio processing module 138, or a combination thereof. The content processing server 214 is configured to receive the stored content 210 and output processed content 216. The processed content 216 may include one or more of the audible events 126, the visual events 128, the sync data 136, the processed audio data 142, or audio data 104 and video data 106 which have been synchronized.

Figure 3:
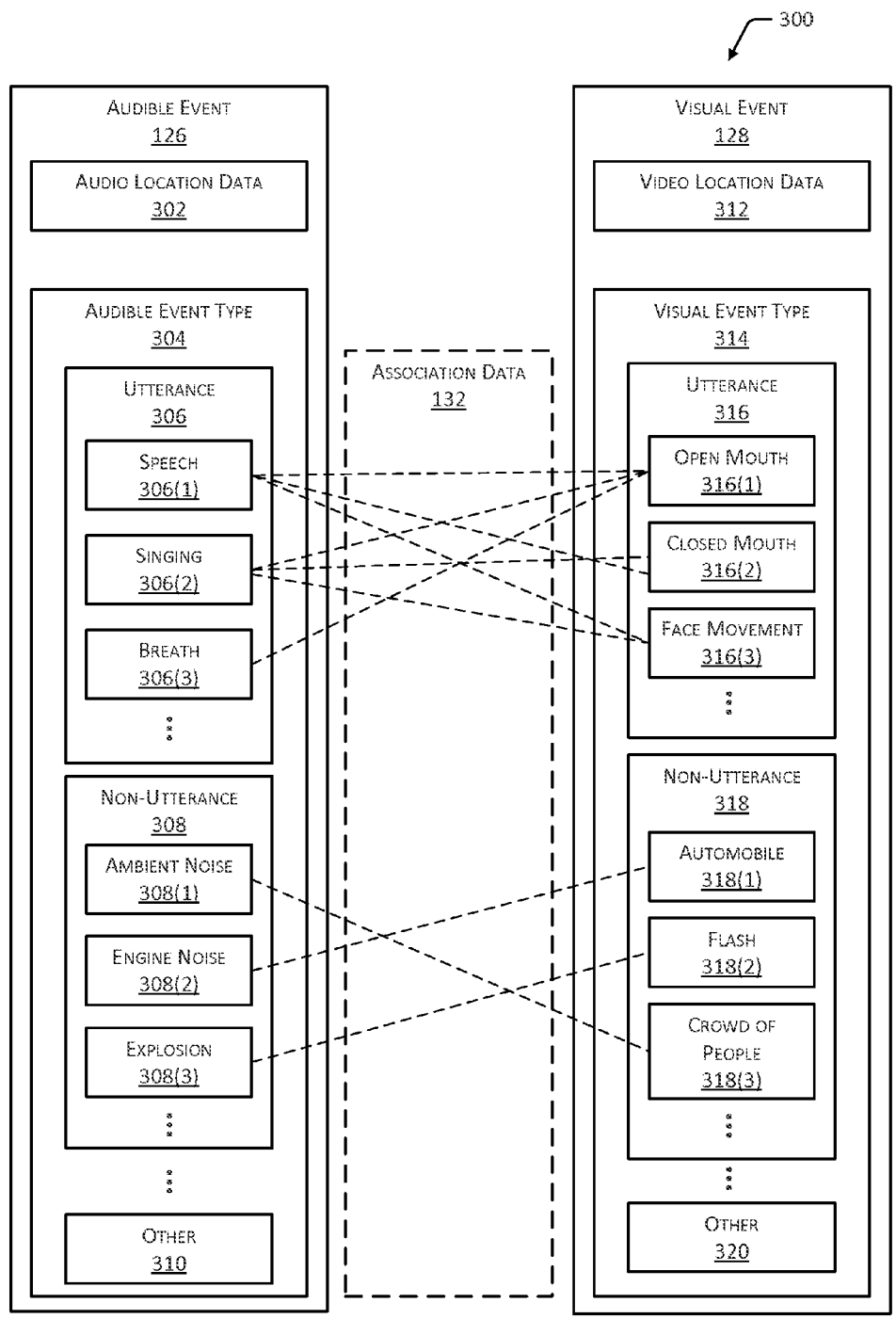
FIG. 3 illustrates a schematic of audible events, visual events, and association data relating the two.

FIG. 3 illustrates a schematic 300 of the audible events 126, the visual events 128, and the association data 132 relating the two. A schematic of the audible event 126 is depicted. As described above, the audible event 126 defines a particular occurrence of sound within the audio data 104.

The audible event 126 may comprise information indicative of an audio location data 302, an audible event type 304, or both. The audio location data 302 is information which specifies a position within the audio data 104 for the audible event 126. The audio location data 302 may be specified as one or more of a time, frame, byte count, and so forth. For example, the audible event 126 may have audio location data 302 of 50,401 frames as measured from beginning of the audio data 104.

The audio location data 302 may be specified as a particular point associated with the occurrence of the audible event 126. This point may be of a beginning, ending, a midpoint, or other defined aspect of the audible event 126. For example, the position may be based on a point of peak energy within the sound of the audible event 126.

The audible event type 304 is configured to provide information descriptive of the type of sound which is associated with the audible event 126. The audible event type 304 may include one or more categories such as an utterance 306, non-utterance 308, or other type 310. The audible event types 304 of utterances 306 include speech 306(1), singing 306(2), breathing 306(3), and so forth. The utterances 306 are those sounds which have been generated by a person, or which simulate or replicate such sounds.

In comparison, the audible event types 304 which are non-utterances 308 include sounds which are not associated with human speech. For example, the non-utterances 308 may include ambient noise 308(1), engine noise 308(2), explosions 308(3), and other sounds such as animal noises.

In some implementations, the other types 310 of audible event type 304 may be specified allowing for finer-grained description of the sounds in the audio data 104. For example, the other types 310 of audible event type 304 may include machine noises, animal noises, and so forth.

Similarly, the visual event 128 defines a particular occurrence of an image, object, action, and so forth, within the video data 106. The visual event 128 may include video location data 312, a visual event type 314, or both. The video location data 312 is information which specifies a position within the video data 106 for the visual event 128. The video location data 312 may be specified as one or more of a time, frame, byte count, and so forth. For example, the visual event 128 may have video location data 312 indicating the visual event 128 occurred at 719.3 seconds as measured from beginning of the video data 106.

The video location data 312 may be specified as a particular point associated with occurrence of the visual event 128. This point may be of a beginning, ending, a midpoint, or other defined aspect of the visual event 128. For example, the position may be based on when a particular object occurs within an image.

The visual event type 314 is configured to provide information descriptive of the type of object or action which is associated with the visual event 128. The visual event type 314 may include one or more categories such as an utterance 316, non-utterance 318, or other type 320. The visual event type 314 of utterances 316 include an open mouth 316(1), closed mouth 316(2), face movement 316(3), and so forth. The utterances 316 are those images which are associated with generation of utterances 306. For example, the visual event type 314 may specify that the visual event 128 is an open mouth 316(1) of a person appearing in the video data 106.

In comparison, the visual event types 314 of non-utterances 318 include objects or actions which are not associated with human speech. For example, the non-utterances 318 may include an image of an automobile 318(1), a flash 318(2), a crowd of people 318(3), and other images such as buildings, scenery, and so forth.

In some implementations, the other types 320 of visual event types 314 may be specified, allowing for finer-grained description of the images in the video data 106. For example, the other types 320 of visual event types 314 may include images of vehicles, airports, animals, and so forth.

The association data 132 provides a correspondence between one or more audible event types 304 and one or more visual event types 314. In this illustration, the association data 132 is represented by dashed lines which connect particular audible event types 304 and visual event types 314. For example, the audible event type 304 of speech 306(1) is associated with the visual event types 314 of open mouth 316(1), closed mouth 316(2), and face movement 316(3). Continuing the example, the explosion 308(3) type of audible event 126 is associated with a visual event type 314 of the flash 318(2).

In some implementations, the audible event types 304 may be assessed in smaller portions. For example, the utterances 306 may be broken down to particular phonemes. Similarly the visual event types 314 may be broken down to particular facial configurations which are associated with the particular phonemes.

Illustrative Scenarios and Processes

Figure 4:
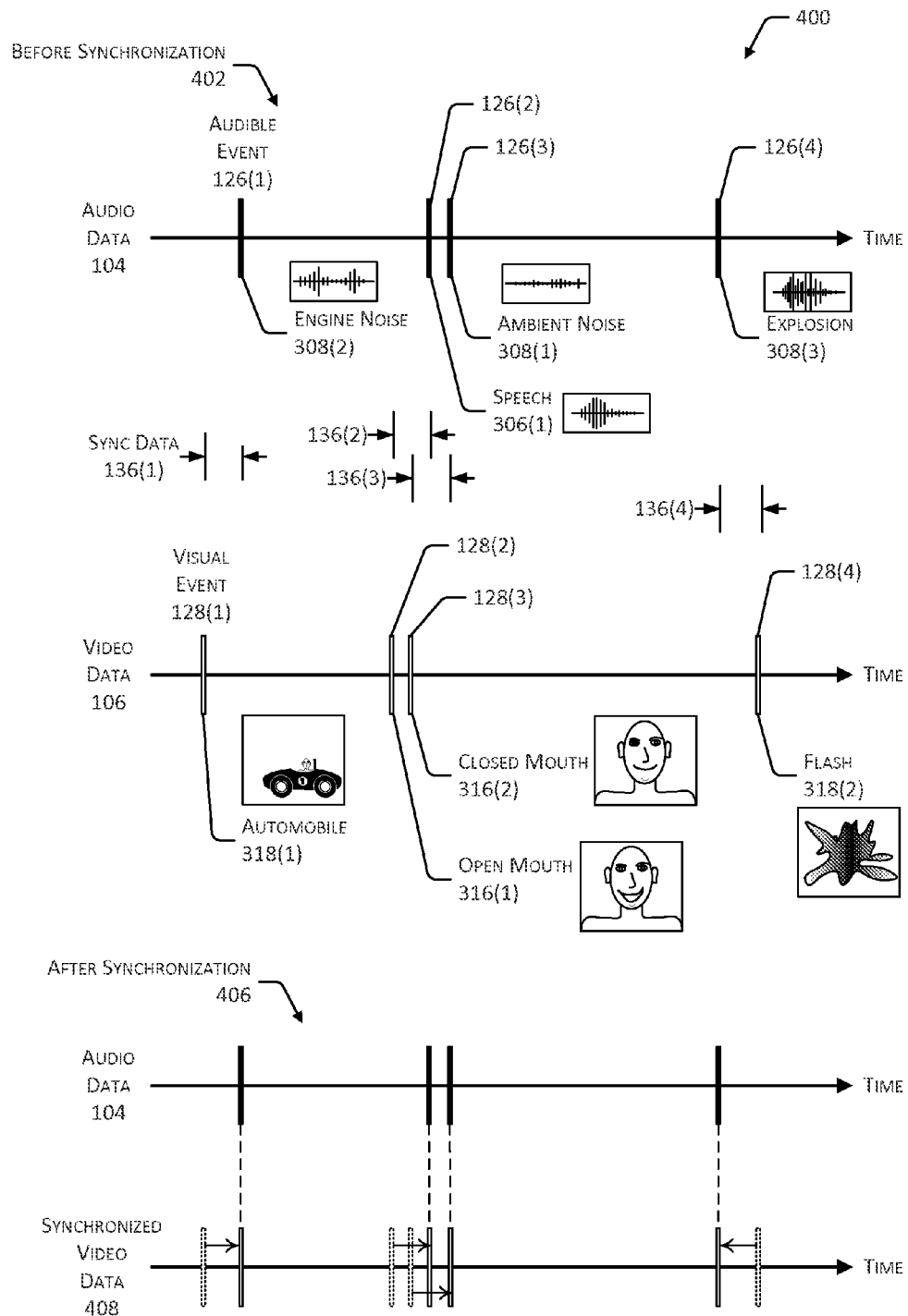
FIG. 4 is a schematic of audio data and video data and sync data based at least in part on associations between audible events and visual events.

FIG. 4 is a schematic 400 of audio data 104, video data 106, and sync data 136 based at least in part on associations between audible events 126 and visual events 128. In this illustration, portions of the audio data 104 and the video data 106 are depicted as timelines with time increasing along the direction of the arrow, from left to right. On each timeline are audible events 126 and visual events 128, respectively. The portion of the audio data 104 depicted includes the audible events 126(1) which involves an audible event type 304 of engine noise 308(2). Also shown are the audible events 126 (2) and 126(3) which correspond to speech 306(1) and ambient noise 308(1), respectively. The fourth audible event 126 (4) depicted is of an explosion 308(3).

With regard to the video data 106, the visual events 128 (1)-(4) are depicted. The visual event 128(1) is a non-utterance 318 visual event type 314, specifically an appearance of an automobile 318(1). The visual event 128(2) is of an open mouth 316(1), while the visual event 128(3) is of a closed mouth 316(2). The visual event 128(4) includes a flash 318 (2), such as from an explosion.

As described above, the event recognition module 124 is configured to identify the audible events 126 and the visual events 128, based at least in part on the signature data 130. The association data 132 provides a correspondence between the audible events 126 and the visual events 128. Based at least in part on this correspondence, the AV data synchronization module 134 is configured to generate sync data 136. The sync data 136 indicates an extent and direction of misaligned or unsynchronized audio data 104 and video data 106.

As illustrated here, before synchronization 402, the audio data 104 and the video data 106 are unsynchronized or misaligned. For example, the visual events 128(1)-(3) occur before the corresponding audible events 126(1)-(3), while the visual event 128(4) occurs after the corresponding audible event 126(4). As described above, the magnitude and direction of the misalignment between the audio data 104 and the video data 106 may vary over time.

The sync data 136 is depicted in this illustration, showing the offset between corresponding events. For example, the sync data 136(1) indicates the offset between the visual event 128(1) and the audible event 126(1). This misalignment may result in a negative user experience while viewing the audio data 104 and the corresponding video data 106.

As described above, the AV data synchronization module 134 is configured to use the sync data 136 to synchronize the audio data 104 and the video data 106. This synchronization may be made for presentation, transmission, or both. For example, the AV data synchronization module 134 may provide the sync data 136 to the presentation module 144 such that, upon presentation to the user, the audible events 126 and the visual events 128 occur within a predetermined time of each other, such as within 20 ms or less.

The timelines are depicted after synchronization 406. In this illustration, portions of the video data 106 associated with the visual events 128 have been shifted in time to generate synchronized video data 408, which is synchronized with the corresponding audible events 126 in the audio data 104. This shifting may include inserting data, removing data, introducing one or more delays, moving ahead or back in the data without presentation or processing, and so forth.

In other implementations, the audio data 104 may be shifted relative to the video data 106, resulting in synchronized audio data. In yet another implementation, both the audio data 104 and the video data 106 may be adjusted or otherwise modified to be synchronized. The adjustments may be to an intermediate point, or a designated virtual point. For example, the audio data 104 and the video data 106 may be out of synchronization by 100 ms, with the audio data 104 leading the video data 106 as described in this illustration. A designated virtual point between the audible events 126 and the visual events 128 may be designated at 50 ms. Continuing the example, the visual data 106 may be advanced 50 ms to the virtual point, while the corresponding audio data 104 is delayed by 50 ms back to the designated virtual point. With the audio data 104 and the video data 106 synchronized, the user experience is improved.

Figure 5:
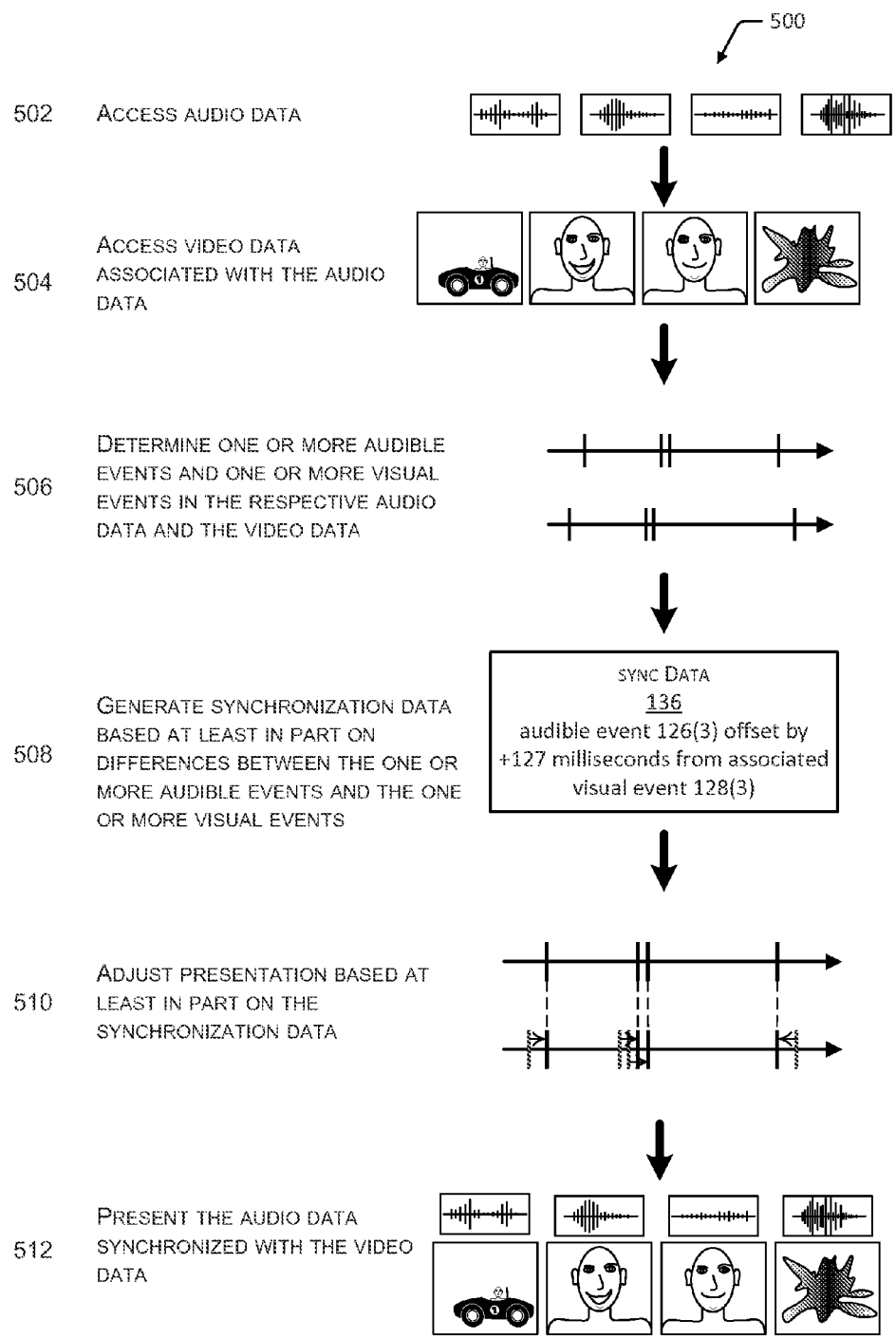
FIG. 5 illustrates operations of synchronizing audio data and video data using the audible events and the visual events.

FIG. 5 illustrates operations 500 of synchronizing the audio data 104 and the video data 106 using the audible events 126 and the visual events 128. These operations may be performed at least in part by the second device 110 described above.

At 502, the audio data 104 is accessed. For example, audio may be received by a microphone, retrieved from storage, and so forth. At 504, video data 106 associated with the audio data 104 is also accessed. For example, the video may be received from a camera, retrieved from storage, and so forth, which corresponds to the audio data 104.

At 506, one or more audible events 126 and one or more visual events 128 are determined in the respective audio data 104 and the video data 106. As described above, the event recognition module 124 may be configured to compare at least a portion of the audio data 104, the video data 106, or both to the signature data 130.

At 508, sync data 136 is generated by the AV data synchronization module 134. As described above, the sync data 136 is based at least in part on differences between the one or more audible events 126 and the corresponding one or more visual events 128.

At 510, presentation of the audio data 104, the video data 106, or both, is adjusted based at least in part on the sync data 136. For example, the presentation module 144 may adjust the presentation of the audio data 104 and the video data 106 using the sync data 136 by introducing delays into the audio data 104, the video data 106, or both. At 512, the audio data 104 as synchronized with the video data 106 is presented. For example, the audio data 104 may be presented by one or more speakers, and the video data 106 may be presented by one or more displays, projectors, and so forth.

Figure 6:
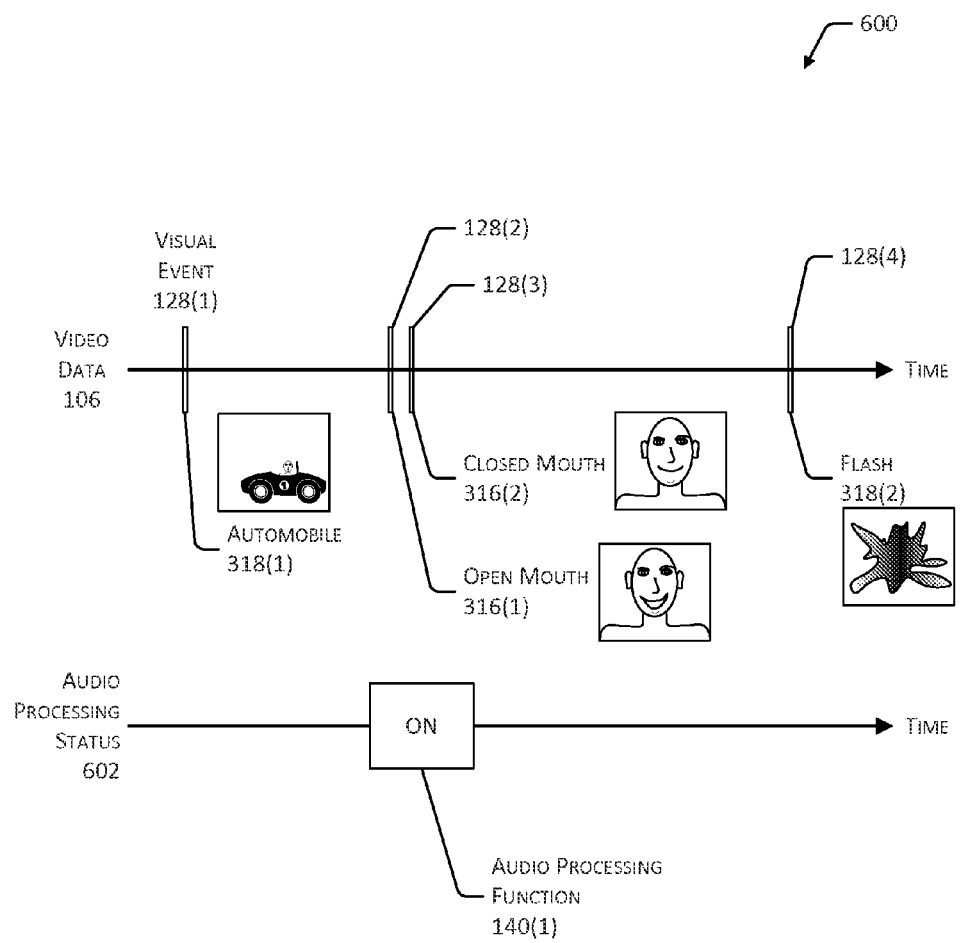
FIG. 6 is a schematic of audio processing based at least in part on visual events.

FIG. 6 is a schematic 600 of audio processing based at least in part on visual events 128. As described above, the audio processing module 138 may be configured to apply one or more audio processing functions 140 to one or more portions of the audio data 104 based at least in part on the one or more visual events 128.

In this illustration, a timeline of a portion of the video data 106 is presented, with the visual events 128, as described above with regard to FIG. 4. In this illustration, the audio processing module 138 is configured to apply one or more audio processing functions 140 to improve intelligibility of human speech and reduce background noise in the audio data 104.

A timeline shows audio processing status 602, corresponding with the video data 106. As depicted here, the audio processing function 140 is applied to the audio data 104 ("on") during the visual event types 314 which are associated with utterances 316, such as the open mouth 316(1) and the closed mouth 316(2). For example, the visual event 128 of a person opening their mouth may result in activation of the audio processing function 140 while a closed mouth may result in deactivation of the audio processing function 140.

The processed audio data 142 which is based on the processing of at least a portion of the audio data 104 with the audio processing function 140 may be output, provided to another device, and so forth.

Figure 7:
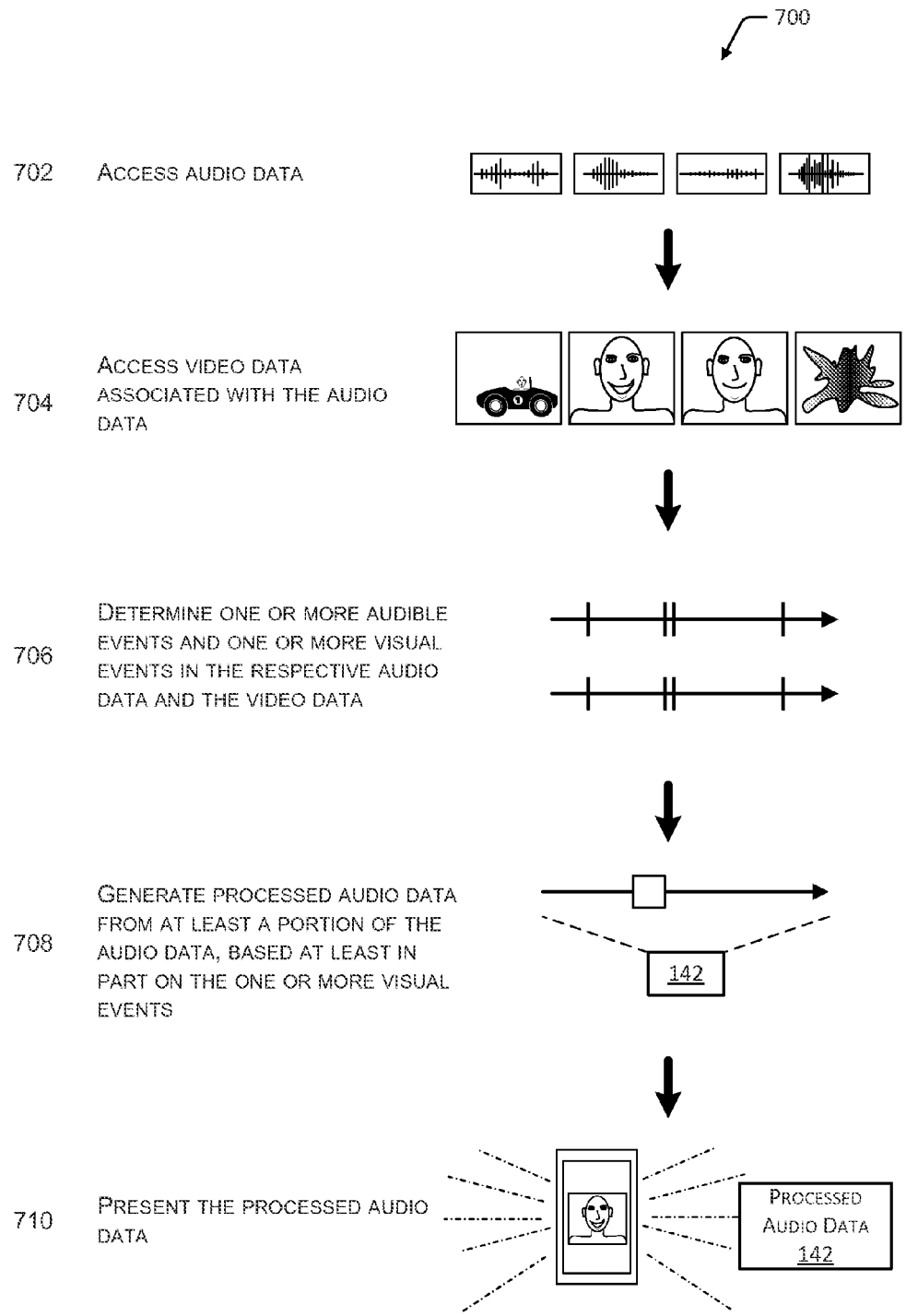
FIG. 7 illustrates operations of applying audio processing based at least in part on visual events.

FIG. 7 illustrates operations 700 of applying audio processing based at least in part on the visual events 128. As described above, the following operations may be carried out at least in part by the audio processing module 138.

At 702, the audio data 104 is accessed. For example, audio may be received by a microphone, retrieved from storage, and so forth. At 704, video data 106 associated with the audio data 104 is also accessed. For example, the video may be received from a camera, retrieved from storage, and so forth which corresponds to the audio data 104. In other implementations, the video data 106 may be accessed first and the audio data 104 may be accessed next.

At 706, one or more audible events 126 and one or more visual events 128 are determined in the respective audio data 104 and the video data 106. As described above, the event recognition module 124 may be configured to compare at least a portion of the audio data 104, the video data 106, or both to the signature data 130.

At 708, processed audio data 142 is generated from at least a portion of the audio data 104. As described above, the timing of when to use the audio processing function 140, or said another way, which portions of the audio data 104 are to be processed using the audio processing function 140, may be based on the visual events 128. Thus, portions of the audio data 104 which correspond to imagery of people talking may have the audio processing functions 140 for improving speech intelligibility applied to create processed audio data 142 of those portions.

As described above with respect to FIG. 6, the determination of which of a plurality of audio processing functions 140 to use may be based at least in part on the visual event type 314. For example, visual event types 314 of utterances 316 may be designated to use the audio processing function 140(1) while the non-utterances 318 may use the audio processing functions 140(2). Likewise, visual event types 314 for non-utterance 318 may be assigned to use the audio processing function 140(2) to generate the processed audio data 142.

At 710, the processed audio data 142 may be presented. The processed audio data 142 may be presented in conjunction with corresponding video data 106, or may be presented as audio only. As described above, the presentation module 144 may be configured to use one or more speakers to generate sound based on the processed audio data 142.

Figure 8:
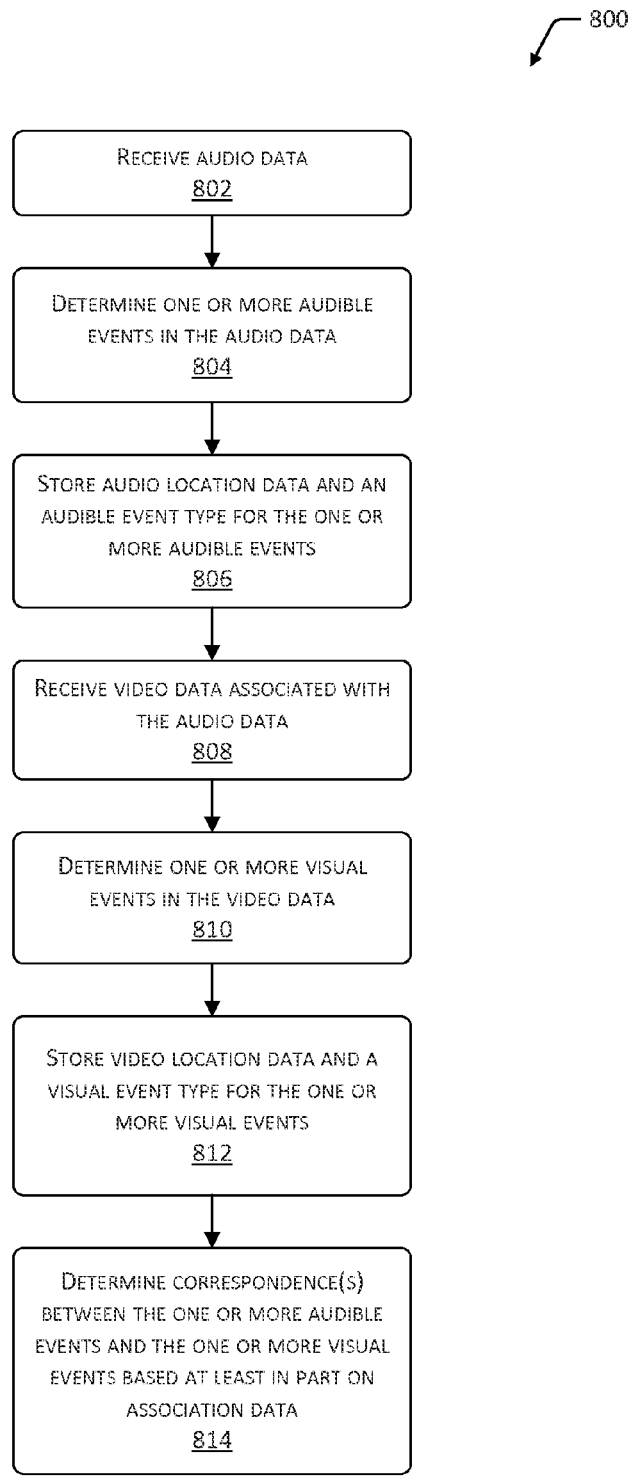
FIG. 8 is a flow diagram of a process of determining and associating audio events and visual events.

FIG. 8 is a flow diagram 800 of a process of determining and associating audible events 126 and visual events 128. This process may be implemented at least in part by the event recognition module 124.

Block 802 receives audio data 104. For example, audio may be received from a microphone, retrieved from storage, and so forth. Block 804 determines one or more audible events 126 occurring in at least a portion of the audio data 104. This determination may include comparing portions of the audio data 104 with previously stored signature data 130. The signature data 130 may include waveforms, descriptive functions which describe a particular waveform or spectral distribution, or other information which is indicative of a particular sound.

Block 806 stores the audio location data 302 and the audible event type 304 for the one or more determined audible events 126. The information indicative of the audible events 126 may be stored as a separate file, embedded within the audio data 104, embedded within the video data 106, and so forth.

Block 808 receives video data 106 associated with the audio data 104. For example, the video may be received from a camera, retrieved from storage, and so forth.

Block 810 determines one or more visual events 128 in the video data 106. This determination may include image analysis, facial recognition, object recognition, and so forth. For example, the event recognition module 124 may be configured to determine the presence and location of facial features, determine movement of facial structures such as jaw, lips, eyelids, and so forth. Portions of the video data 106 matching the signature data 130, which has been previously stored, may be designated as particular visual events 128. Block 812 stores the video location data 312 and the visual event type 314 for the one or more visual events 128.

Block 814 determines a correspondence between the one or more audible events 126 and the one or more visual events 128 based at least in part on the association data 132. In some implementations, this correspondence may be provided by the association data 132 which designates associations between particular audible event types 304 and visual event types 314. For example, the association data 132 may indicate that the explosion 308(3) audible event type 304 corresponds to the flash 318 (2) visual event type 314.

In some implementations, the association data 132 may be generated manually or using machine learning techniques. For example, the association data 132 may be generated after using machine learning techniques such as neural network or a Bayesian network which have been trained using synchronized audio data 104 and video data 106.

Figure 9:
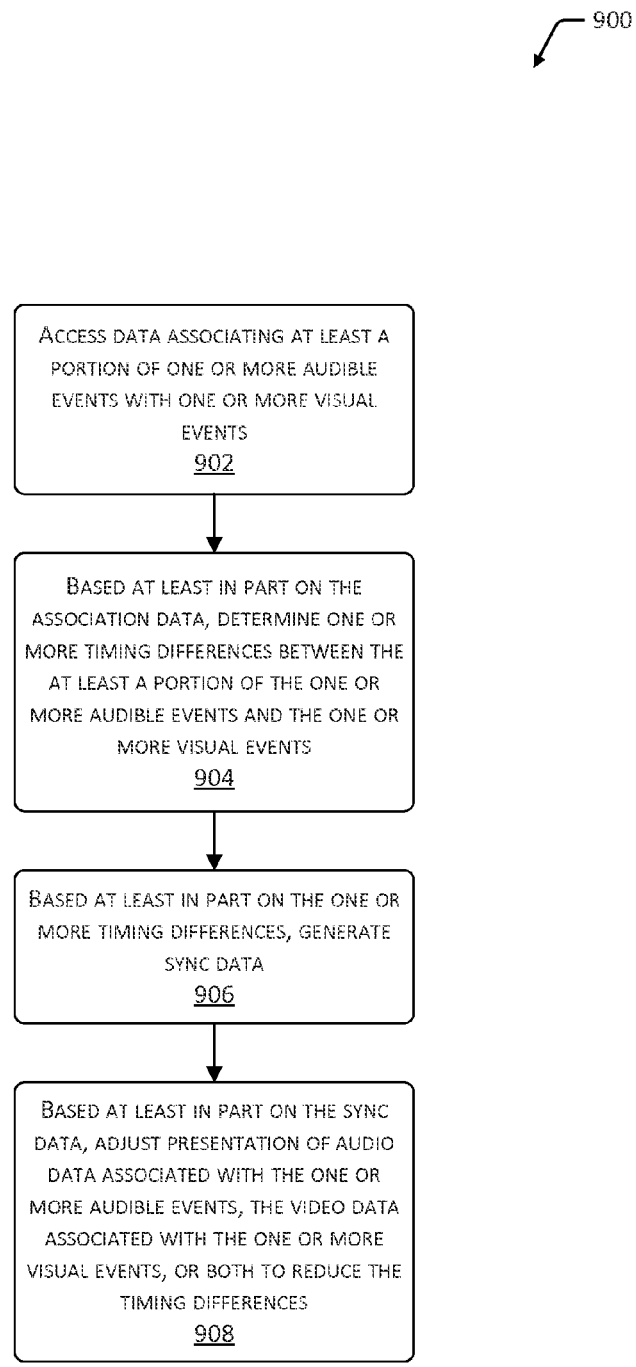
FIG. 9 is a flow diagram of a process of synchronizing audio data and video data based at least in part on the association between the audio events and the visual events.

FIG. 9 is a flow diagram 900 of a process of synchronizing audio data 104 and video data 106 based at least in part on the association between the audible events 126 and the visual events 128. This process may be implemented by the AV data synchronization module 134.

Block 902 accesses association data 132 associating at least a portion of the one or more audible events 126 with one or more visual events 128. For example, the association data 132 may include information that the audible events 126(2) and 126(3) correspond to the visual events 128(3) and 128(4), respectively.

As described above, the audible events 126 may comprise information indicative of the audio location data 302 and the audible event type 304. The audio location data 302 comprises data indicative of a time, data frame, or byte count within the audio data 104. The audible event type 304 may include data designating the audible event 126 as an utterance 306 type of event comprising audio emitted by a person or a non-utterance 308 type of event comprising audio emitted by an object or animal.

As also described above, the visual events 128 may comprise information indicative of the video location data 312 indicative of a time, data frame, or byte count within the video data 106. The visual events 128 may also include the visual event type 314 comprising data designating the visual event 128 as an utterance 316 event comprising images associated with emission of audio by a person or a non-utterance 318 event comprising images associated with emission of audio by an object.

Based at least in part on the association data 132, block 904 determines one or more timing differences between one or more of the associated audible events 126 and the corresponding visual events 128. For example, as depicted above with respect to FIG. 4, the visual event 128(2) may precede the audible event 126(2) by 37 ms.

Based at least in part on the timing differences, block 906 generates sync data 136. The sync data 136 may be indicative of differences in timing between a particular audible event 126 and a particular corresponding visual event 128. As described above, the sync data 136 may be associated with a particular magnitude and a direction, such as +177 ms, or −63 frames. The sync data 136 may be based at least in part on previously determined latencies associated with presentation of the audio data 104 and the video data 106. For example, it may be determined that a particular device exhibits a total latency of 121 ms when presenting audio data 104 and 272 ms when presenting video data 106. These latencies may be incorporated into the determination of the sync data 136.

In some implementations, the sync data 136 may be sent to another device. The device may be configured to, based at least in part on the sync data 136, adjust presentation of the audio data 104, the video data 106, or both, to reduce the one or more timing differences during presentation. For example, the event recognition module 124 may be on the second device 110 while the AV data synchronization module 134 executes on the third device 204.

Based at least in part on the sync data 136, block 908 adjusts contemporaneous presentation of the audio data 104, the video data 106, or both to reduce the timing differences. For example, the sync data 136 indicates the visual events 128 in the video data 106 presented on the display device are lagging behind the corresponding audible events 126 in the audio data 104 which are presented using the one or more speakers. Based on this sync data 136, timing delays may be included into the presentation of the audio data 104 to bring the audio data 104 and the video data 106 into synchronization.

In another implementation, the adjustment of the presentation may involve discarding a portion of the audio data 104, discarding a portion of the video data 106, or both. In another implementation, data may be added, such as empty or duplicate frames. During the presentation of the audio data 104 and the video data 106, the one or more audible events 126 and associated one or more visual events 128 are synchronized. In some implementations, the synchronization may be such that the audible events 126 and the visual events 128 occur within 50 ms of one another.

Figure 10:
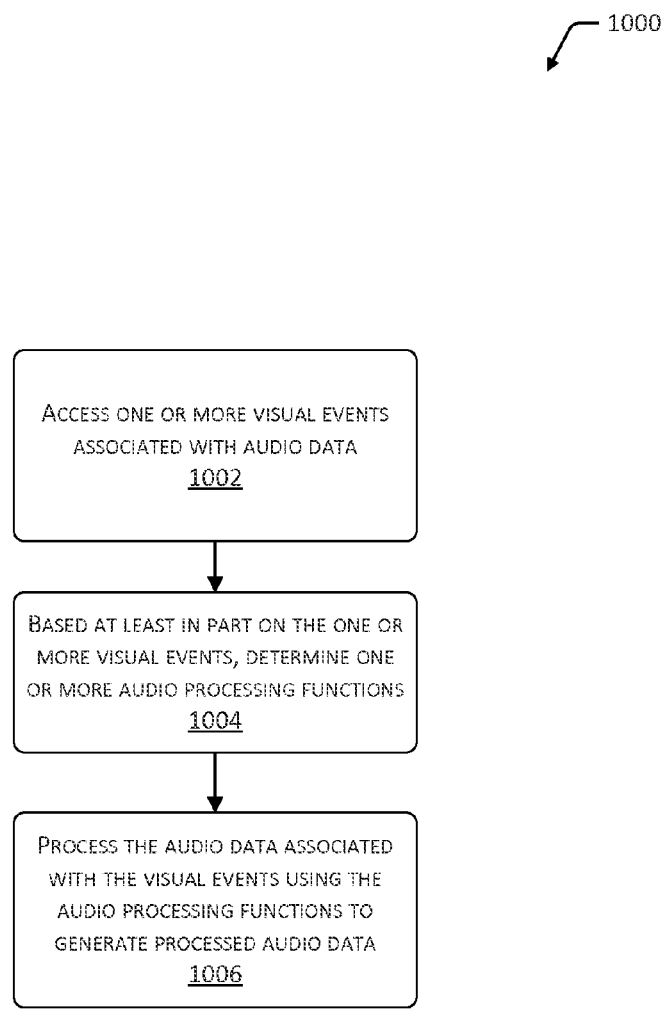
FIG. 10 is a flow diagram of processing the audio data based at least in part on the visual events.

FIG. 10 is a flow diagram 1000 of processing the audio data 104 based at least in part on the visual events 128. As described above, one or more of which audio processing function 140, or when to apply the audio processing function 140, may be based at least in part on the visual events 128.

Block 1002 accesses one or more visual events 128 associated with audio data 104. For example, the visual events 128(1)-(4) which are associated with the audio data 104 may be accessed. As described above, the visual events 128 may include the video location data 312 and the visual event type 314. In some implementations, the visual event type 314 may be omitted, and the presence of a defined visual event 128 may be used as an indicator to apply one or more of the audio processing function 140. As described above, in one implementation, the one or more visual events 128 may be one or more persons uttering one or more sounds.

The one or more visual events 128 may be associated with a portion of the audio data 104 which extends from a first time before the occurrence of the one or more visual events 128 to a second time after the occurrence of the one or more visual events 128. For example, a window to which the audio processing function 140 is applied may extend to 2 seconds before and 5 seconds after the event. In some implementations, the audio processing function 140 may be configured to ramp-up or ramp-down to provide a smooth transition.

Block 1004, based at least in part on the one or more visual events 128, determines one or more audio processing functions 140 for use. This determination may include retrieving information from a lookup table. For example, visual event type 314 utterances 316 may be associated with the audio processing function 140(1). The audio processing function 140(1) may be configured to attenuate non-speech sounds, such as background or ambient noise.

Block 1006 processes at least a portion of the audio data 104 which is associated with the visual events 128 using the audio processing functions 140 to generate the processed audio data 142.

The portion of the audio data 104 to be processed may be based at least in part on the video location data 312. As described above, the video location data 312 provides a time within the video data 106. Where the audio data 104 and the video data 106 are synchronized, the video location data 312 may be used in place of the audio location data 302. In some implementations, the AV data synchronization module 134 may also be utilized to synchronize the content or confirm the synchronization.

In one implementation, a block may access the association data 132 comprising information indicative of a correspondence of the one or more visual events 128 to one or more audible events in audio data 104. Another block may, based at least in part on the association data 132, generate sync data 136 indicative of differences in timing between the one or more of the visual events 128 and the corresponding one or more audible events 104.

In another implementation, the sync data 136 may be used to determine the corresponding portion of the audio data 104 for processing using the corrective timing relative to the video location data 312. For example, the video location data 312 may indicate a location of 1776 frames. The sync data 136 may indicate that the video data 106 is leading the audio data 104 by 37 frames. Using this sync data 136, adjusted audio location data of 1739 frames may be determined. Based on this determination, the audio processing function 140 may be applied to the adjusted audio location 1739 frames, or frames before and after.

The audio processing module 138 may be used in conjunction with other modules, such as the AV data synchronization module 134, the presentation module 144, and so forth. As described above, presentation of the audio data 104, the video data 106, or both, may be adjusted to reduce one or more timing differences between the two.

The processing of the audio data 104 may comprise configuring a digital signal processor to implement the one or more audio processing functions 140. In other implementations, analog processing circuitry may be used to implement the audio processing functions 140.

Those having ordinary skill in the art will readily recognize that certain steps or operations illustrated in the figures above can be eliminated or taken in an alternate order. Moreover, the methods described above may be implemented as one or more software programs for a computer system and are encoded in a computer readable storage medium as instructions executable on one or more processors.

The computer readable storage medium can be any one of an electronic storage medium, a magnetic storage medium, an optical storage medium, a quantum storage medium, and so forth. Separate instances of these programs can be executed on or distributed across separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations.

Although the present disclosure is written with respect to specific embodiments and implementations, various changes and modifications may be suggested to one skilled in the art, and it is intended that the present disclosure encompass such changes and modifications that fall within the scope of the appended claims.

What is claimed is:

1. A computer-implemented method for utilizing processing resource devices of a computerized system, the computer-implemented method comprising:
   receiving audio data;
   determining one or more audible events in the audio data;
   receiving video data associated with the audio data;
   determining one or more visual events in the video data;
   based at least in part on the one or more visual events, determining one or more audio processing functions;
   processing the audio data associated with the visual events using the audio processing functions to generate processed audio data;
   accessing association data, wherein the association data is indicative of correspondence between at least a portion of the one or more audible events and at least a portion of the one or more visual events;
   based at least in part on the association data, determining one or more timing differences between one or more of the audible events and the one or more visual events which correspond;
   based at least in part on the one or more timing differences, generating sync data; and
   based at least in part on the sync data, adjusting presentation of the processed audio data, the video data, or both to reduce the one or more timing differences.

2. The method of claim 1, wherein the sync data comprises an indication of an offset between the audio data and the video data, the offset comprising information indicative of time, frames, or bytes.

3. The method of claim 1, the determining one or more audible events comprising comparing at least a portion of the audio data with previously stored signature data.

4. The method of claim 1, the determining one or more visual events comprising comparing at least a portion of the video data with previously stored signature data.

5. The method of claim 1, wherein the audio processing functions are configured to apply one or more filters to signals in the audio data.

6. A device, comprising:
   at least one memory storing computer-executable instructions; and
   at least one processor configured to access the at least one memory, and execute the computer-executable instructions to:
      determine one or more audible events in audio data and one or more visual events in the video data based at least in part on comparison of at least a portion of the audio data and the video data to previously stored signature data;
      generate association data indicative of a correspondence between at least a portion of one or more of the audible events and at least a portion of the one or more of the visual events; and
   based at least in part on the association data, generate sync data indicative of differences in timing between one or more of the audible events and one or more of the corresponding visual events.

7. The device of claim 6, wherein the audible event comprises:
   audio location data indicative of a time, data frame, or byte count within the audio data; and
   audible event type data designating the audible event as an utterance event, the utterance event including audio emitted by a person or a non-utterance event comprising audio emitted by an object.

8. The device of claim 6, wherein the visual event comprises:
   video location data indicative of a time, data frame, or byte count within the video data; and
   visual event type data designating the visual event as an utterance event including images associated with emission of audio by a person or a non-utterance event comprising images associated with emission of audio by an object.

9. The device of claim 6, further comprising instructions to send the sync data to a second device configured to, based at least in part on the sync data, adjust presentation of the audio data, the video data, or both to reduce the differences in timing.

10. The device of claim 6, further comprising:
    a speaker coupled to the at least one processor; and
    a display device coupled to the at least one processor; and
    wherein the at least one memory further stores instructions to:
       adjust presentation of the audio data using the speaker, adjust presentation of the video data using the display device, or both based at least in part on the sync data.

11. The device of claim 10, the adjustment of the presentation comprising instructions to:
    discard a portion of the audio data, discard a portion of the video data, or both, such that during the presentation of the audio data and the video data the one or more audible events and the corresponding one or more visual events are synchronized to within 50 milliseconds of one another.

12. The device of claim 6, wherein the sync data comprises information indicative of a difference in presentation of the audio data and the video data, the difference designated as one or more of time, data frames, or bytes.

13. The device of claim 6, wherein the sync data is based at least in part on one or more previously determined latencies associated with presentation of the audio data and the video data.

14. A method comprising:
    accessing one or more visual events associated with audio data;
    based at least in part on the one or more visual events, determining one or more audio processing functions; and
    processing the audio data associated with the one or more visual events using the determined one or more audio processing functions to generate processed audio data.

15. The method of claim 14, wherein the one or more visual events are associated with the audio data which extends from a first time before an occurrence of the one or more visual events to a second time after the occurrence of the one or more visual events.

16. The method of claim 14, wherein the one or more visual events comprise one or more persons uttering one or more sounds and the determined one or more audio processing functions are configured to attenuate non-speech sounds.

17. The method of claim 14, further comprising:
    accessing association data comprising information indicative of a correspondence of the one or more visual events to one or more audible events in the audio data; and
    based at least in part on the association data, generating sync data indicative of differences in timing between the one or more of the visual events and the corresponding one or more audible events.

18. The method of claim 17, further comprising:
    based at least in part on the sync data, adjusting presentation of the audio data, video data, or both to reduce the one or more timing differences.

19. The method of claim 14, the processing the audio data comprising configuring a digital signal processor to implement the one or more audio processing functions.

20. The method of claim 1, wherein the visual event comprises an appearance of an object and the one or more audible events comprise a non-utterance event comprising audio associated with the object.

\* \* \* \* \*